(12) United States Patent
Huang

(10) Patent No.: US 9,520,944 B2
(45) Date of Patent: Dec. 13, 2016

(54) OPTICAL COMMUNICATION DEVICE

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/736,857

(22) Filed: Jun. 11, 2015

(65) Prior Publication Data

US 2016/0142141 A1    May 19, 2016

(30) Foreign Application Priority Data

Nov. 17, 2014 (TW) .............................. 103139719 A

(51) Int. Cl.
*H04B 10/40* (2013.01)
*H04B 10/25* (2013.01)

(52) U.S. Cl.
CPC ................................ *H04B 10/2504* (2013.01)

(58) Field of Classification Search
CPC ...................................................... H04B 10/40
See application file for complete search history.

(56) References Cited

U.S. PATENT DOCUMENTS

| | | | | |
|---|---|---|---|---|
| 2011/0299856 A1* | 12/2011 | Koo | .......................... | H03K 5/05 398/163 |
| 2013/0148969 A1* | 6/2013 | Sheu | ....................... | H04B 10/40 398/79 |
| 2015/0295675 A1* | 10/2015 | Sugama | ................... | G02B 6/42 398/65 |

\* cited by examiner

*Primary Examiner* — Shi K Li
(74) *Attorney, Agent, or Firm* — Zhigang Ma

(57) ABSTRACT

An optical communication device includes an optical fiber, two chips, a light emitter, a photoelectric conversion device, and a circuit board. The chips includes a substrate, and a polarizing beam splitter positioned on the substrate, the polarizing beam splitter includes a first coupling device, second coupling device, a Y-waveguide, and a TM filter coupling to the third channel. The chips, the light emitter, and the photoelectric conversion device are coupled to the circuit board, the light emitter, and the photoelectric conversion device are connected electrically with the circuit board.

12 Claims, 4 Drawing Sheets

OPTICAL COMMUNICATION DEVICE

FIELD

The subject matter herein generally relates to an optical communication device.

BACKGROUND

In the field of fiber optical communication technologies, an optical communication device is used to emit and receive the optical signal. However, the optical communication device, normally supplies a single optical fiber for a single communication channel, thus, a lot of optical fibers are needed for multi-channel applications.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Implementations of the present technology will now be described, by way of example only, with reference to the attached figure.

DETAILED DESCRIPTION

Figure 1:
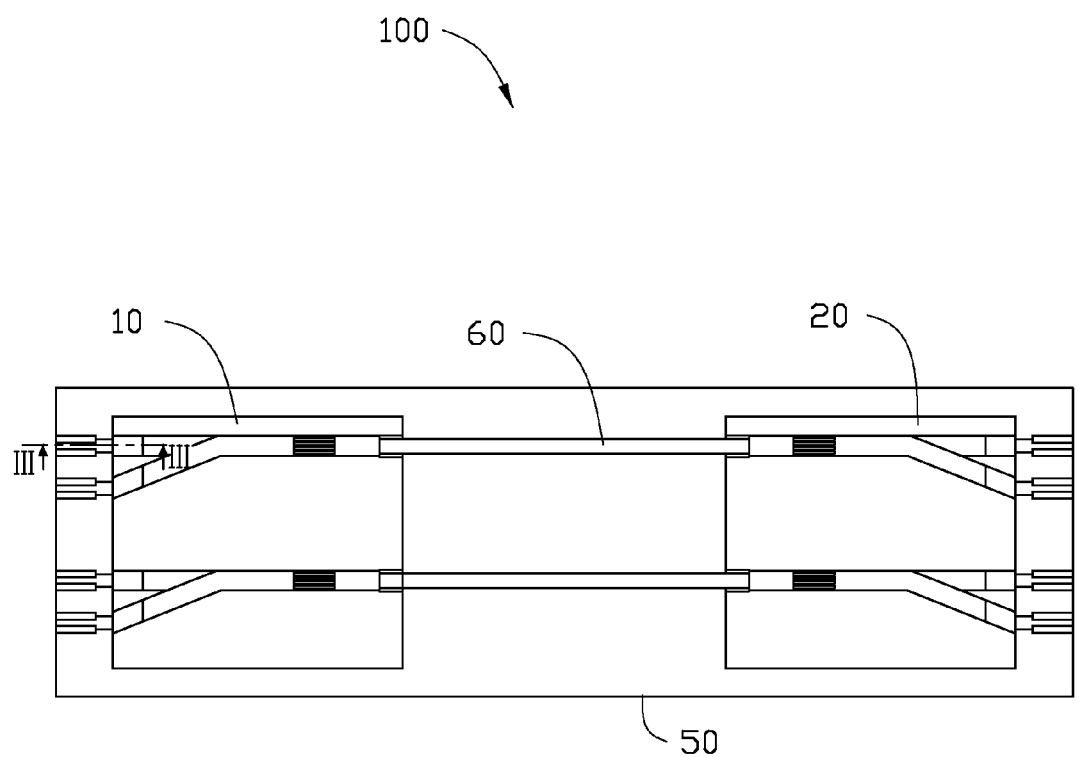
FIG. 1 is a diagrammatic view of a first embodiment of an optical communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure relates to an optical communication device.

FIG. 1 illustrates an optical communication device 100, which includes a first chip 10, a second chip 20, four light emitters 30, four photoelectric conversion devices 40, a circuit board 50, and two optical fibers 60.

Figure 2:
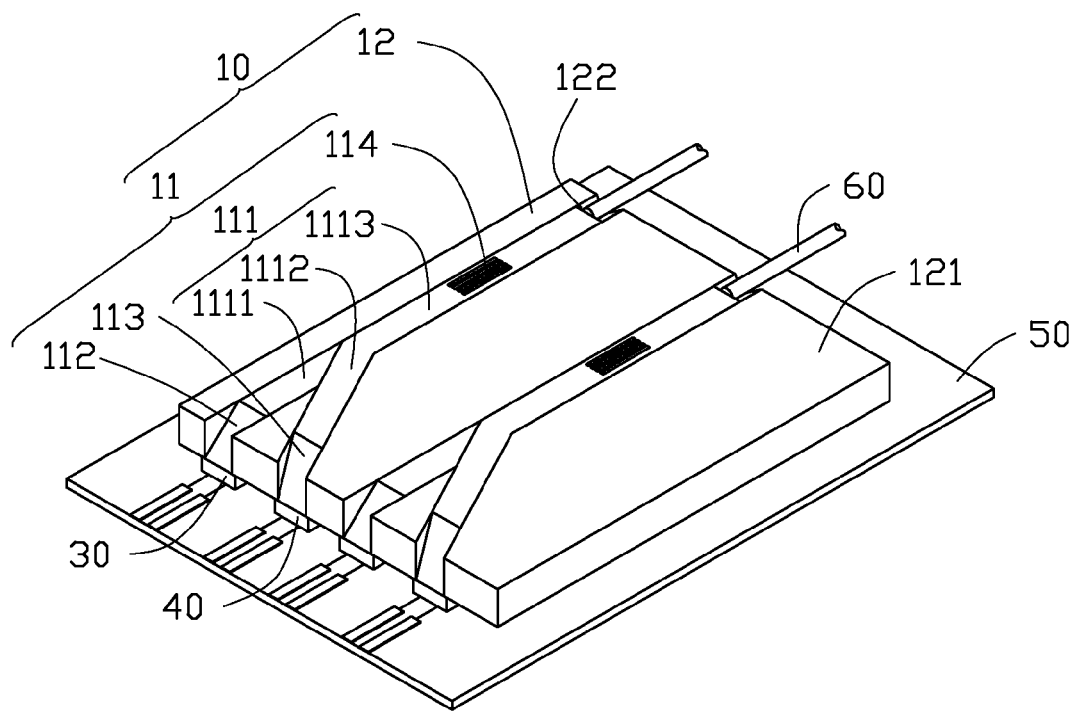
FIG. 2 is a diagrammatic view of the first embodiment of a first chip of the optical communication device of FIG. 1.

FIG. 2 illustrates the first chip 10 and the second chip 20. The first chip 10 includes a pair of polarizing beam splitters 11 and a substrate 12. Each one of the polarizing beam splitters 11 includes a waveguide 111, a first coupling device 112, a second coupling device 113, and a transverse magnetic filter (TM filter) 114. The waveguide 111 can have a shape that substantially resembles a letter "Y." Tus, a waveguide 111 being substantially shaped like the letter "Y" can be called a Y-waveguide 111. The second chip 20 has same structures and functions as the first chip 10.

The substrate 12 includes a top surface 121, and a groove 122. The Y-waveguide 111, the first coupling device 112, and the second coupling device 113 are formed from the top surface 121 toward an inside portion of the substrate 12. The groove 122 can have a shape that substantially resembles a letter "V." Tus, a groove 122 being substantially shaped like the letter "V" can be called a V-groove 122. The Y-waveguide 111 includes a first channel 1111 corresponding to the first coupling device 112, a second channel 1112 corresponding to the second coupling device 113, and a third channel 1113. The V-groove 122 is used to hold the optical fiber 60. The optical fiber 60 is corresponding to the third channel 1113. The first channel 1111 and the second channel 1112 are connected with the third channel 1113, the first channel 1111 and the third channel 1113 are used to transmit transverse electric waves and transverse magnetic waves, the second channel 1112 is configured to transmit transverse magnetic waves. In the embodiment, the substrate 12 is formed by Lithium Niobate ($LiNbO_3$), a bandwidth of the Y-waveguide 111 is 50 to 62.5 micrometers, the first channel 1111 and the third channel 1113 is a titanium-diffused ("Ti-diffused") waveguide, the second channel 1112 is a gallium/titanium-diffused ("Ga/Ti-diffused") waveguide. The first channel 111 and the third channel 1113 can transmit the transverse electric (TE) waves and TM waves, and the second channel 1112 can only transmit the TM waves. In other embodiments, the substrate 12 is formed by photoelectric materials.

Figure 3:
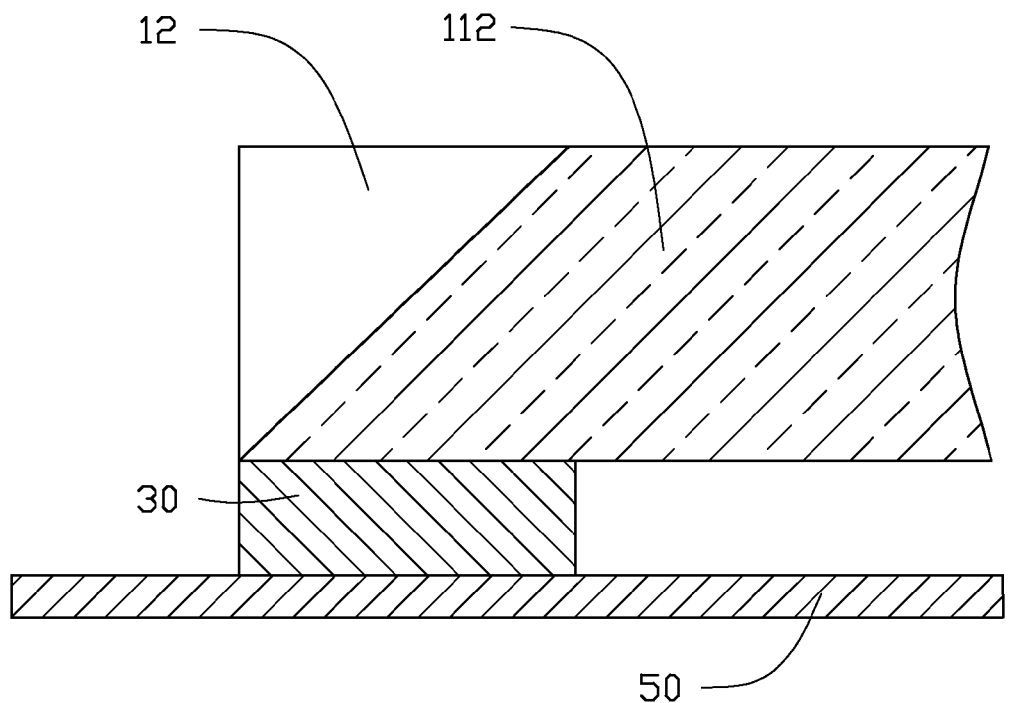
FIG. 3 is a diagrammatic, cross sectional view of the first embodiment of a first coupling device of the optical communication device of FIG. 1.

FIG. 3 is a cross sectional view of the first coupling device 112. The first coupling device 112 is used to totally reflect a light beam from the light emitter 30 toward the first channel 1111. The light beam transmits into the first channel 1111 after multi reflections within the first coupling device 112. The second coupling device 113 is used to totally reflect the light beam transmitting from the second channel 1112, and the light beam transmits into the photoelectric conversion device 40 after multiple reflections within the second coupling device 113.

The TM filter 1114 is coupled to the third channel 1113. The TM filter 1114 is used to filter TE waves from the light beam and allows the TM waves of the light beam to pass though.

Figure 4:
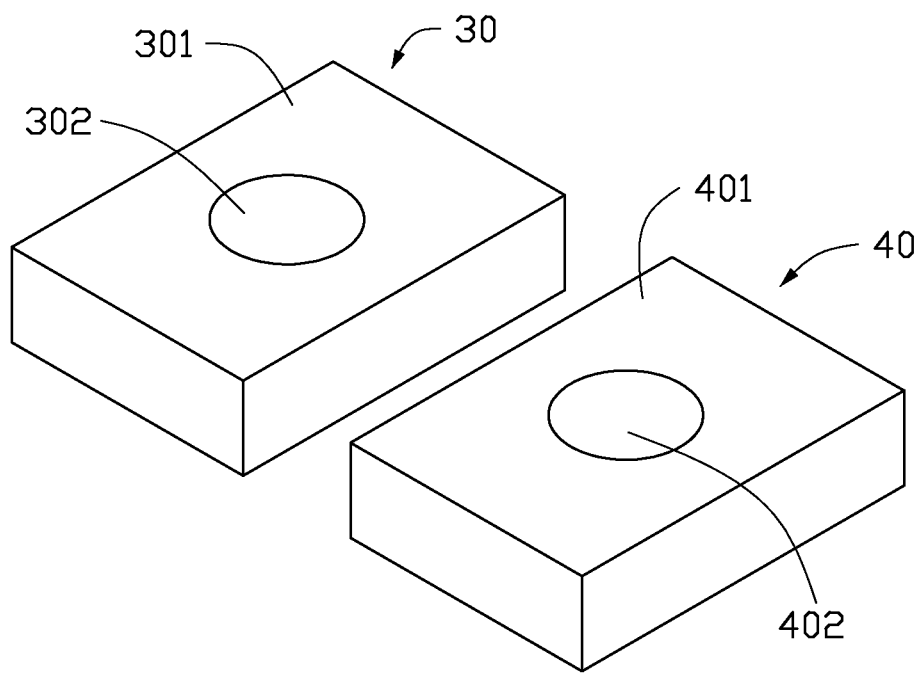
FIG. 4 is a diagrammatic view of the first embodiment of a light emitter and a photoelectric conversion device of the optical communication device of FIG. 1.

FIG. 4 illustrates the light emitter 30 and the photoelectric conversion device 40. The light emitter 30 includes a first surface 301, the first surface 301 is parallel to the top surface 121, a first lens 302 is defined on the first surface 301 and is corresponding to the light emitter 30, the first lens 302 is used to transmit the light beam to the first coupling device 112 from the light emitter 30. The light beam includes TE waves and TM waves from the light emitter 30. In the embodiment, the light emitter 30 is a laser diode. In other embodiments, the light emitter 30 is a light emitting diode.

The photoelectric conversion device 40 includes a second surface 401 which is parallel to the top surface 121, and a second lens 402 which is defined on the second surface 401 and is corresponding to the photoelectric conversion device 40. The second lens 402 is used to receive the light beam from the second coupling device 113. The photoelectric conversion device 40 is used to convert the optical signals received from the second lens 402 to electric signals. In the embodiment, the photoelectric conversion device 40 is a photodiode.

In the embodiment, the light emitter 30 and the photoelectric conversion device 40 are coupled to the circuit board by three dimensional integrated circuit package (3D IC package), and electrically connect with the circuit board. The first chip 10 and the second chip 20 are also coupled to the circuit board via 3D IC package.

In the embodiment, the light emitter 30 of the first chip 10 emits the light beam, the light beam passes through the first coupling device 112 to enter the first channel 1111 of the Y-waveguide 111, the first channel 1111 and the third channel 1113 transmit the light beam to reach the TM filter 114. The TM filter 114 filters the TE waves from the light beam, the TM waves of the light beam pass through the TM filter 114 and the optical fiber to transmit into the Y-waveguide of the second chip 20. In the second chip 20, the light beam transmits to the second channel and passes through the second coupling device 113 to input the photoelectric conversion device, the photoelectric conversion device converts the optical signals to the electric signals, and then, the electric signal is transmitted to the circuit board 50.

In some embodiments, the optical communication device 100 includes a first polarizing beam splitter of the first chip, a second polarizing beam splitter of the second chip, and one optical fiber. In other embodiments, the optical communication device 100 may include a plurality of optical fibers. However, each one of the optical fibers have to correspond to one of the first polarizing beam splitters of the first chip and one of the second polarizing beam splitters of the second chip, one of the first polarizing beam splitters and the second polarizing beam splitter is corresponding to the light emitter, the other one is corresponding to the photoelectric conversion device. In some embodiments, the optical communication device 100 includes a plurality of polarizing beam splitters, the polarizing beam splitters may be positioned on a same chip. In other embodiments, each of the polarizing beam splitters is positioned on an individual chip.

The embodiments shown and described above are only examples. Many details are often found in the art such as the other features of an optical communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical communication device, comprising:
    an optical fiber;
    two chips coupled to the optical fiber, each of the two chips comprising:
        a substrate; and
        a polarizing beam splitter positioned on the substrate, the polarizing beam splitter comprising:
            a first and second coupling device;
            a Y-waveguide including a first channel corresponding to the first coupling device, a second channel corresponding to the second coupling device, and a third channel corresponding to the optical fiber; and
            a TM filter coupled to the third channel;
    a light emitter corresponding to the first coupling device;
    a photoelectric conversion device corresponding to the second coupling device; and
    a circuit board;
    wherein the chips, the light emitter, and the photoelectric conversion device are coupled to the circuit board, the light emitter, and the photoelectric conversion device are connected electrically with the circuit board.

2. The optical communication device in accordance with claim 1, wherein the substrate includes a top surface and a V-groove, the Y-waveguide, the first coupling device, and the second coupling device are formed from the top surface toward a inside portion of the substrate, the V-groove is configured to holding the optical fiber.

3. The optical communication device in accordance with claim 2, wherein the light emitter includes a first surface, the first surface is parallel to the top surface, a first lens is defined on the first surface and is corresponded to the light emitter.

4. The optical communication device in accordance with claim 3, wherein the photoelectric conversion device includes a second surface, the second surface is parallel to the top surface, a second lens is defined on the second surface and is corresponded to the photoelectric conversion device.

5. The optical communication device in accordance with claim 1, wherein the first channel and the second channel are connected with the third channel, the first channel and the third channel are configured to transmit transverse electric waves and transverse magnetic waves, the second channel is configured to transmit transverse magnetic waves.

6. The optical communication device in accordance with claim 1, wherein the first coupling device is configured to total-reflect a light beam toward the first channel and the light beam inputs the first channel, the second coupling device is configured to total-reflect the light beam from the second channel, and the light beam inputs photoelectric conversion device.

7. The optical communication device in accordance with claim 1, wherein the substrate is formed by lithium niobate.

8. The optical communication device in accordance with claim 1, wherein the substrate is formed by photoelectric material.

9. The optical communication device in accordance with claim 1, wherein a width of the Y-waveguide is formed from 50 to 62.5 micrometer.

10. The optical communication device in accordance with claim 1, wherein the light emitter is a laser diode.

11. The optical communication device in accordance with claim 1, wherein the light emitter is a light emitting diode.

12. The optical communication device in accordance with claim 1, wherein the chips are coupled to the circuit board via 3D IC package.

* * * * *